No. 897,838. PATENTED SEPT. 1, 1908.
T. D. LOGUE.
LID LIFTING ATTACHMENT.
APPLICATION FILED DEC. 10, 1907.
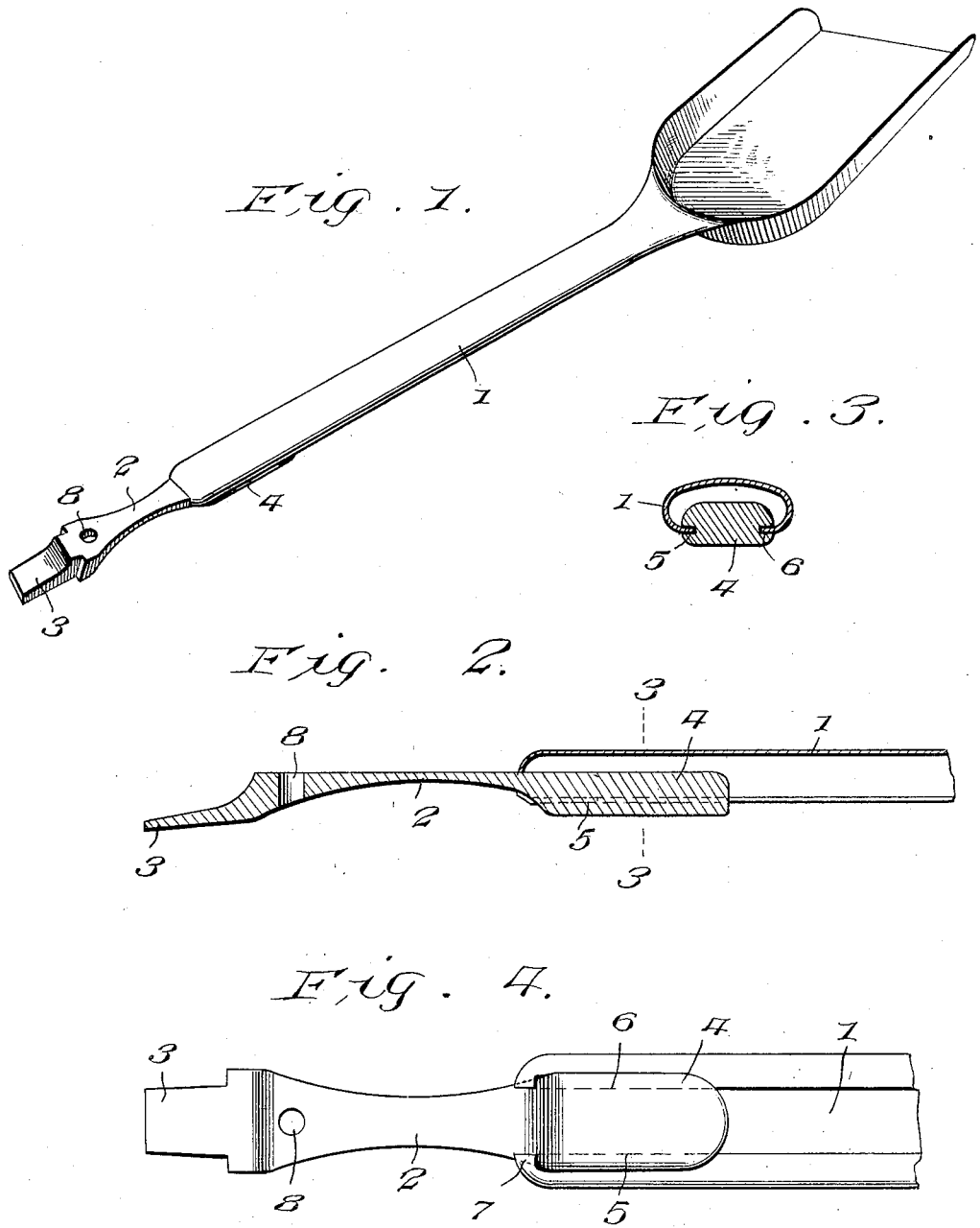
WITNESSES:
INVENTOR
T. D. Logue
BY
W. J. Fitzgerald
Attorneys

UNITED STATES PATENT OFFICE.

THOMAS D. LOGUE, OF SINNAMAHONING, PENNSYLVANIA, ASSIGNOR OF ONE-HALF TO NATHAN SILIN, OF SINNAMAHONING, PENNSYLVANIA.

LID-LIFTING ATTACHMENT.

No. 897,838.  Specification of Letters Patent.  Patented Sept. 1, 1908.

Application filed December 10, 1907. Serial No. 405,837.

*To all whom it may concern:*

Be it known that I, THOMAS D. LOGUE, a citizen of the United States, residing at Sinnamahoning, in the county of Cameron and State of Pennsylvania, have invented certain new and useful Improvements in Lid-Lifting Attachments; and I do hereby declare the following to be a full, clear, and exact description of the invention, such as will enable others skilled in the art to which it appertains to make and use the same.

My invention relates to lifting attachments for lids, such as stove lids, or the like, and my object is to provide a device of this class, which may be secured to the handles of cooking utensils, fire shovels, or other devices.

A further object is to provide means to secure the lid lifter to the handle in such manner that said lifter may be moved longitudinally, if desired.

Other objects and advantages will be hereinafter referred to and more particularly pointed out in the claims.

In the accompanying drawings which are made a part of this application, Figure 1 is a perspective view, showing my improved lid lifter secured to the handle of a shovel. Fig. 2 is a central, longitudinal, sectional view thereof. Fig. 3 is a sectional view as seen on line 3—3, Fig. 2, and, Fig. 4 is a bottom plan view of the lid lifter and a portion of the handle to which the same is secured.

Referring to the drawings in which similar reference numerals designate corresponding parts throughout the several views, 1 indicates a handle such as is used on cooking utensils, fire shovels, or the like, said handle being preferably made by bending the metal at the edges of the handle to form a substantially tubular construction, to the outer end of which is attached my improved form of lid lifter 2, one end of the lifter having a tongue 3 thereon, which is adapted to enter the usual form of eyes on stove lids (not shown) when the lids are to be removed or placed in position on the stove, while the opposite end of the lifter is provided with a head 4, along the two edges of which are provided channels 5, in which take the inwardly bent edges 6 of the handle 1 and, by constructing the body of the lifter narrower than the head 4, said lifter may be readily moved longitudinally and the body of the lifter seated in the handle 1.

The lifter 2 is prevented from entirely leaving the handle 1 by means of projections 7, which are formed integral with the handle 1 and project below the body portion of the lifter 2, so that when the head 4 comes in contact with the projections 7, the outward movement of the lifter will be stopped, while the inward movement of the lifter is likewise limited by the projections 7 engaging the lower face of the tongue 3.

The lifter 2 is provided with an opening 8, adjacent its outer end, so that the article to which the lifter is secured, may be readily suspended from a hook or nail prepared for that purpose, and, when the lifter is not in use, it may be moved into the handle 1, so as not to interfere with the using of the handle and extended when a lid is to be removed from the stove or returned thereto, thus obviating the necessity of employing a separate lifter which might easily become misplaced.

It will thus be seen that I have provided a very cheap and economical means for attaching the lid lifter to the handle of a cooking utensil or usual form of fire shovel and one wherein the lifter may be moved into the handle when the lifter is not in use and, while I have shown and described the lifter as being movably mounted upon the handle, it will be readily understood that the lifter may be fixed to the handle, if desired.

What I claim is:

1. An attachment for handles, comprising the combination with a handle; of a lifter, a head at one end of said lifter, having channels in the edge thereof adapted to receive portions of the handle, a tongue at the opposite end of the lifter and projections on the handle adapted to extend below the lifter and limit the inward and outward movement thereof.

2. An attachment for handles, comprising the combination with a handle, having its edges bent downwardly and inwardly; of a lifter, a head at one end of said lifter having channels therein to receive the inwardly extended edges of the handle, a tongue at the opposite end of the lifter and projections at the end of the handle extending below the lifter to limit the outward and inward movement of the lifter.

In testimony whereof I have signed my name to this specification in the presence of two subscribing witnesses.

THOMAS D. LOGUE.

Witnesses:
 EDWARD LOGUE,
 O. J. SMITH.